United States Patent [19]

Zavoli et al.

[11] Patent Number: 4,788,645
[45] Date of Patent: Nov. 29, 1988

[54] METHOD AND APPARATUS FOR MEASURING RELATIVE HEADING CHANGES IN A VEHICULAR ONBOARD NAVIGATION SYSTEM

[75] Inventors: Walter B. Zavoli, Palo Alto; Kenneth A. Milnes, Fremont; Glenn R. Peterson, Los Gatos, all of Calif.

[73] Assignee: Etak, Incorporated, Menlo Park, Calif.

[21] Appl. No.: 843,185

[22] Filed: Mar. 21, 1986

[51] Int. Cl.⁴ .............................................. G06F 15/50
[52] U.S. Cl. .................................. 364/449; 364/451; 364/460; 340/988
[58] Field of Search ............... 364/443, 424, 449, 451, 364/457, 460, 571, 444; 340/988, 990, 995; 73/178 R

[56] References Cited

U.S. PATENT DOCUMENTS

| | | | |
|---|---|---|---|
| 3,715,572 | 2/1973 | Bennett | 364/460 |
| 3,845,289 | 10/1974 | French | 364/444 |
| 3,849,636 | 11/1974 | Helms | 364/460 |
| 4,032,758 | 6/1977 | Lewis | 364/457 |
| 4,084,241 | 4/1978 | Tsumura | 364/460 |
| 4,459,667 | 7/1984 | Takeuchi | 364/424 |
| 4,555,761 | 11/1985 | Matsumoto et al. | 364/449 |
| 4,633,709 | 1/1987 | Numata et al. | 364/443 |
| 4,672,563 | 6/1987 | Harumatsu et al. | 340/988 |
| 4,679,147 | 7/1987 | Tsujii et al. | 364/449 |

Primary Examiner—Gary Chin
Attorney, Agent, or Firm—Fliesler, Dubb, Meyer & Lovejoy

[57] ABSTRACT

A method and apparatus for measuring relative heading changes in a vehicular onboard navigation system is provided comprising apparatus for providing signals corresponding to differential wheel distance measurements, the velocity and wheel tracking distance of the vehicle. When front wheel distance measurements are used in a vehicle having an Ackerman-type steering system, an apparatus for providing a signal corresponding to an effective front wheel tracking distance as a function of the curvature of turn is also provided.

42 Claims, 1 Drawing Sheet

METHOD AND APPARATUS FOR MEASURING RELATIVE HEADING CHANGES IN A VEHICULAR ONBOARD NAVIGATION SYSTEM

BACKGROUND OF THE INVENTION

1. Field of the Invention

The present invention is related in general to a method and an apparatus for measuring heading changes of a road vehicle in a vehicular onboard navigation system, and in particular to a method and apparatus for measuring relative heading changes in such a system which comprises differential wheel distance measurements, velocity measurements, the wheel track and the wheel base of the vehicle. An output from a flux gate compass or other independent means for measuring changes in the heading of the vehicle may be used from time to time to compensate for errors in the wheel distance measurements.

2. Description of Prior Art

In a prior known vehicular dead reckoning onboard navigation system installed in a wheeled land vehicle, a display was provided in the vehicle for displaying a map of the roads in the vicinity in which the vehicle was driven. The vehicle was represented on the display by a symbol located in the center of the display.

In operation, as the vehicle was driven in a straight line along a road, the map was moved in a straight line on the display relative to the symbol. A representation of the road was located thereon in a position beneath the symbol. When the vehicle reached an intersection and was turned to be driven along a second road, i.e. changed heading, the map was rotated on the display relative to the symbol by a corresponding amount. The movement of the map on the display therefore corresponded, or should have corresponded, precisely to the movement of the vehicle along the roads. In practice, however, the signals used for moving the map on the display were found to suffer from a certain degree of inaccuracy and were manifested to an observer of the display by an error in the displayed position or heading of the vehicle symbol relative to the map.

One of the sources of the error in the displayed position or heading of the vehicle was found to be due to inaccuracies associated with the measuring of vehicular heading changes.

Heretofore, absolute magnetic as well as relative heading changes of a vehicle have been measured using various types of magnetic compasses, such as, for example, a magnetic flux gate compass and various types of wheel distance measuring systems and as, for example, a differential odometer system.

In the operation of the magnetic flux gate compass, as well as other types of magnetic compasses, a signal proportional to the strength of the earth's magnetic field relative to a fixed axis in the magnetic compass is generated. As a vehicle in which the magnetic compass is mounted is turned, and the angle which the axis makes with the earth's magnetic field changes, the signal generated by the magnetic compass is generated with a corresponding change in its magnitude and/or phase.

The accuracy of the output of the magnetic compass and any change therein depends on the uniformity of the earth's magnetic field in the vicinity in which the vehicle is operated. If the vehicle passes through an anomaly in the earth's magnetic field, such as may be caused by a large building, or if the compass is tilted away from the horizontal plane as when the vehicle is on a hill, banked curve, or the like, the output of the magnetic compass may indicate a heading change which did not actually occur. Such an occurrence can result in serious errors in displayed vehicle heading and position information.

In prior known simple differential odometer systems of the type used in prior known vehicular navigation systems as described above and elsewhere as, for example, U.S. Pat. No. 3,845,289, issued to Robert L. French, a pair of sensors were used for measuring the distance traveled by the front pair or rear pair of wheels of a vehicle.

In operation, the sensors in the system measured the distance traveled by one wheel in the vehicle relative to the other during a turn. From the difference in the distances measured during the turn, a computer generated a signal $\Delta\theta_w$ corresponding to the resultant change in the relative heading of the vehicle using the equation $$\Delta\theta_w = (D_L - D_R)/T \tag{1}$$

where
- $\Delta\theta_w$ = change in heading
- $D_L$ = distance traveled by left wheel
- $D_R$ = distance traveled by right wheel
- T = distance between the two wheels, e.g. wheel track In practice, the signal generated using equation (1) was often found to be inaccurate.

SUMMARY OF THE INVENTION

In looking for the source of the inaccuracies found in prior known vehicular differential odometer systems, it was found that the magnitude of the inaccuracy generally depended on the velocity of the vehicle during a turn and on whether the wheel distance measurements were made from the front wheels or the rear wheels.

When the measurements are made from the rear wheels, the source of inaccuracy generally was found to depend on the velocity of the vehicle. However, when the measurements are made using the front wheels in a vehicle which comprises an Ackerman steering system, as do most vehicles today, the source of inaccuracy was found to depend on the velocity of the vehicle as well as on a change in effective front wheel track. In an Ackerman steering system, it is found that the effective wheel track decreases as the radius of turn decreases.

In view of the foregoing, there is provided for use in a vehicular onboard navigation system in accordance with the present invention a novel method and apparatus for measuring relative heading changes of a vehicle.

In one aspect of the present invention, there is provided a pair of wheel sensors. The sensors are provided for measuring the differences in distance D traveled by a pair of wheels of a vehicle during a turn. The sensors are located on two laterally opposed wheels of the vehicle, either the rear wheels or the front wheels. In either case, the wheels are separated by a wheel track distance T. A signal corresponding to the velocity V of the vehicle is also provided.

In operation, relative heading changes of the vehicle are calculated from the measurements taken using the equation:

$$\Delta\theta_w \Delta D/T(1+aV^2) \tag{2}$$

where $\Delta\theta_w$ = change in heading due to differential wheel distance measurements $\Delta D$ = the difference in the distance traveled by the right and left wheels T = the wheel track V = the vehicle velocity a = a constant From time to time when the vehicle makes a turn and the change in direction can be accurately estimated using other data and measurements available, the change in heading $\Delta\theta_w$, calculated from the differential wheel distance measurements, is compared with a corresponding independently measured change in heading $\Delta h$. When a difference is noted, the heading change $\Delta h$ is assumed to be the correct heading change and the magnitude of the constant, a, in equation (2) is changed by a relatively small amount in the direction to make this difference smaller. In this manner, errors in $\Delta\theta_w$ due to errors in the wheel distance measurements caused by forces on the wheels, including centripetal force, loading of the wheels, tire pressure, etc., are reduced.

In another aspect of the present invention, when the sensors described above are provided for measuring the difference in distance traveled by two laterally spaced front wheels of a vehicle during a turn, changes in the front wheel track during the turn are also considered. In most modern vehicles the front wheels are rotated about short axles called Pitman arms in an Ackerman-type steering system.

In an Ackerman-type steering system the magnitude of the track of the wheels is related to the curvature of the turn such that $$T_E = T_F \left[ P + (1 - P) \times \sqrt{0.5 + 0.5 \sqrt{1 - \frac{\left(\frac{\Delta D}{AD}\right)^2}{1 - 0.25\left(\frac{\Delta D}{AD}\right)^2} \times \left(\frac{2B}{T_F}\right)^2}} \right] \quad (3)$$

where $T_E$ = the effective track $T_F$ = the track not during a turn

P = the ratio of single Pitman arm length to one-half the total track (approx. 1/8)

$\Delta D$ = the difference in distance traveled by the wheels

AD = the average distance traveled by the wheels

B = the distance between the front and rear wheel axles (wheel base)

In the latter aspect, the heading $\Delta\theta_w$ is calculated using equation (1) or (2) wherein $T = T_E$ from equation (3) above.

The mounting of the sensors to sense the distance traveled by the driven wheels results in, or at least significantly increases the opportunity for, errors in the measurements of the distances traveled by the wheels. This is because the driven wheels tend to slip especially on icy, wet or gravel-type surfaces. Accordingly, the sensors are mounted to sense the distance traveled by non-driven wheels in the preferred embodiments of the invention. In four wheel drive type vehicles, the sensors are typically mounted for sensing the front wheels because, in practice, the front wheels are used for driving the vehicle only part of the time.

The square root operations in equation 3 above typically consume a considerable amount of computational time. Accordingly, in preferred embodiments of the present invention there is provided a look-up memory. In the look-up memory there is stored a plurality of values of $T_E$, each of which is calculated using equation 3 for a selected value of $\Delta D/AD$.

BRIEF DESCRIPTION OF THE DRAWING

The above and other objects, features and advantages of the present invention will become apparent from the following detailed description of the accompanying drawings in which.

DETAILED DESCRIPTION OF THE DRAWING

Figure 1:
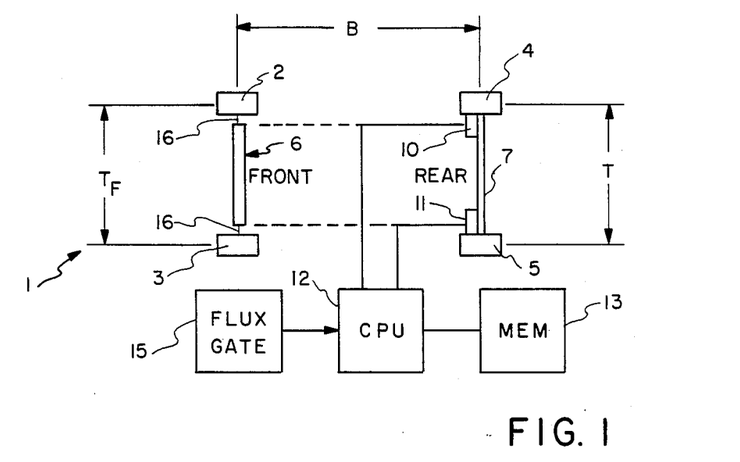
FIG. 1 is a block diagram of an embodiment of the present invention.

Referring to FIG. 1, there is shown a representation of a land vehicle designated generally as 1 comprising a pair of front wheels 2 and 3 and a pair of rear wheels 4 and 5. The front wheels 2 and 3 are mounted on the axles located on the ends of Pitman arms 16 in an Ackerman-type steering system designated generally as 6. The rear wheels 4 and 5 are mounted on the ends of straight or independent axles designated generally as 7. The distance between the front and rear axles is called the wheelbase of the vehicle and is designated by the letter B. The distance between the rear wheels 4 and 5 is called the rear wheel track of the vehicle and is designated by the letter T. The nominal distance between the front wheels 2 and 3 of the vehicle, called the nominal front wheel track, is designated by the letters $T_F$. The term nominal is used to describe the track when the vehicle is driven in a straight line because, as will be further described below, as a vehicle turns, the front wheel track varies as a function of the curvature of the turn.

In one embodiment of the present invention, a pair of wheel distance measuring sensors 10 and 11 is mounted in the vicinity of the rear wheels 4 and 5. Coupled to an output of the sensors 10 and 11 there is provided a central processing unit 12. Coupled to the central processing unit 12 there is provided a memory 13 and a conventional flux gate, compass 15 or other suitable source of heading information.

Figures 2, 3, 4:
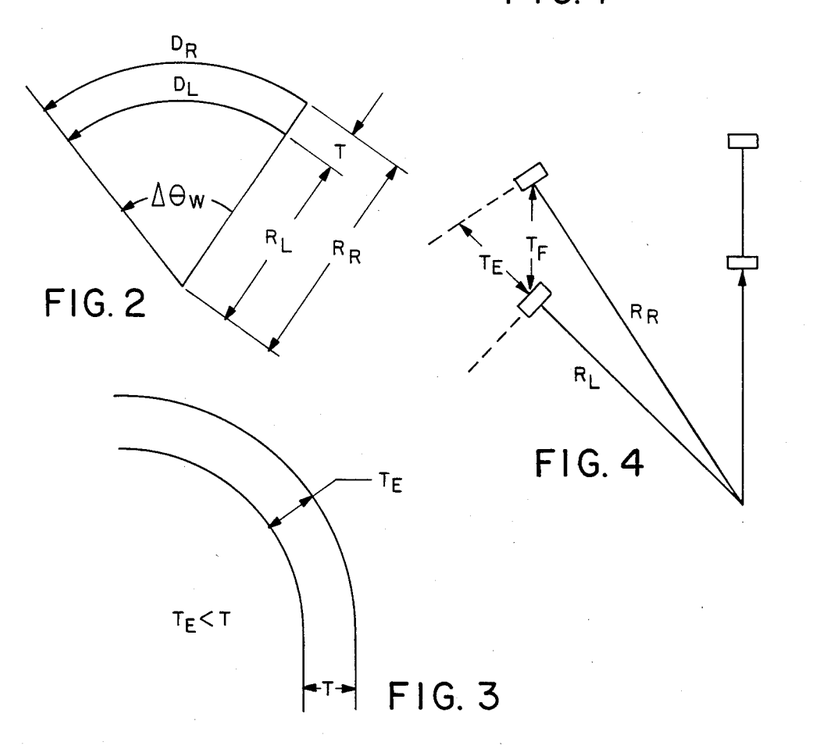
FIG. 2 is a geometrical representation of a vehicle making a left turn.
FIG. 3 is a representation of the effective wheel track of the front wheels of a vehicle in a left turn.
FIG. 4 is a geometrical representation of the effective wheel track of the front wheels of a vehicle in a left turn.

Referring to FIG. 2, there is shown a diagram of the vehicle 1 in a left-hand turn wherein the distance traveled by the right rear wheel $D_R$ and the distance traveled by the left rear wheel $D_L$ subtend an angle $\Delta\theta_w$ which is equal to a change of heading $\Delta\theta_w$ of the vehicle. The radius of the arc described by the right rear wheel 4 is designated $R_R$. The radius of the arc described by the left wheel 5 is designated $R_L$. The difference between the radii $R_R$ and $R_L$ is the rear wheel separation previously designated T.

As can be seen from FIG. 2, the heading change $\Delta\theta_w$ of the vehicle 1 can be determined as follows.

$$D_L = \Delta\theta_w \times R_L \quad (4)$$

$$D_R = \Delta\theta_w \times R_R \quad (5)$$

where
$R_L$ = radius of turn for left wheel
$R_R$ = radius of turn for right wheel
Subtracting equation (5) from equation (4) yields $$(D_L - D_R) = \Delta\theta_w \times (R_L - R_R) \quad (6)$$

or $$\Delta\theta_w = (D_L - D_R)/(R_L - R_R) = \Delta D/T \quad (7)$$

From the above equation it is clear that $\Delta\theta_w$ would comprise an accurate measure of the heading change of the vehicle 1 if the distance traveled by the wheels 4 and 5 were in exact accordance with equations (4) and (5). In practice, however, this is rarely if ever the case.

During a turn, forces on the wheels are such that the distance a wheel travels is to a better approximation a non-linear function of the velocity of the vehicle. To compensate for these forces, the above equation (7) is modified by a function of V as, for example, as follows:

$$\Delta\theta_w = \Delta D/T(1 + aV^2) \quad (8)$$

where
$\Delta\theta_w$ = change in heading due to differential wheel distance measurements
$\Delta D$ = the difference in distance of travel of the right and left wheels
$T$ = the wheel track
$V$ = the vehicle velocity
$a$ = a constant The constant of proportionality, a, varies among car types, tire characteristics and under different car loading conditions. In one embodiment the constant, a, can be precomputed for a given vehicle or type of vehicle under an average load. However, in a preferred embodiment of the present invention, the constant of proportionality, a, initially comprises a precomputed value and thereafter is automatically refined as the vehicle is driven.

To refine the constant, a, a change in the heading of the vehicle $\Delta\theta_C$ is obtained from, for example, the flux gate 15 and used as follows.

Let $\theta_C 1$ and $\theta_w 1$ be compass and wheel headings before a turn and $\theta_C 2$ and $\theta_w 2$ be compass and wheel headings after a turn. Then $$\Delta\theta_C = \theta_C 2 - \theta_C 1 \quad (9)$$

and $$\Delta\theta_w = \theta_w 2 - \theta_w 1 = \Delta D/T(1 + aV^2) \quad (10)$$

and $$\text{ERROR} = \begin{cases} \Delta\theta_w - \Delta\theta_C, & \text{if } \Delta\theta_w \geq 0 \\ \Delta\theta_C - \Delta\theta_w, & \text{if } \Delta\theta_w < 0 \end{cases} \quad (11)$$

In practice, the magnitude of the ERROR, as measured in equation (11), is limited when it is used for refining the constant, a, as follows:

$$\text{ERROR} = \begin{cases} -M & \text{if ERROR} < -M \\ \text{ERROR} & \text{if } -M \leq \text{ERROR} \leq M \\ M & \text{if ERROR} > M \end{cases} \quad (12)$$

where M = a selected threshold level.

To compute a more stable estimate of the coefficient a, a filter constant $T_C$ is used in the following equation:

$$a = a_{old} + (\text{ERROR}/T_C) \quad (13)$$

where
$T_C$ = the filter distance constant
$a_{old}$ = the then current constant, a In the preferred embodiment, the coefficient update process, of equations (9) through (13) above is only executed when certain criteria are met indicating a more accurate estimate of the coefficient, a, can be calculated. These criteria are (1) a turn of over 45°, (2) velocity in the range of 15 to 45 mph and (3) consistent compass measurements.

In a second aspect of the present invention, the sensors 10 and 11 are mounted for measuring the distance traveled by the front wheels 2 and 3 of the vehicle 1.

Referring to FIGS. 3 and 4, it is apparent that in a turn the effective front wheel track $T_E$ can become substantially smaller than the nominal front wheel track $T_F$ which is the physical separation of the front wheels. This is because in an Ackerman-type steering system, the front axle does not remain perpendicular to the tangent of the turn and consequently, the tighter the turn the smaller will be the effective wheel track. It is important to adjust for this smaller wheel track by computing an effective track, $T_E$, which compensates for the geometric foreshortening of the front wheel track during a turn. $T_E$ is then substituted for T in equations (7) or (8).

The following equation (14) closely approximates the effective wheel track $T_E$ derived from the geometry of FIG. 4:

$$T_E = T_F \left[ P + (1 - P) \times \sqrt{0.5 + 0.5 \sqrt{1 - \frac{\left(\frac{\Delta D}{AD}\right)^2}{1 - 0.25\left(\frac{\Delta D}{AD}\right)^2} \times \left(\frac{2B}{T_F}\right)^2}} \right] \quad (14)$$

where
$T_E$ = the effective track during a turn
$T_F$ = the track not during a turn
P = the Pitman arm ratio (approximately ⅛)
$\Delta D$ = the difference in distance traveled by the wheels AD = the average distance traveled by the wheels
B = the distance between the front and rear wheel axles With the exception of $\Delta D$ and AD, the other parameters of the above equation can be measured directly from the vehicle (and are input during calibration).

The ratio of $\Delta D/AD$ is called a curvature of turn and represents the rate (over distance not time) that the vehicle is turning. The above equation, then, is used to compute an effective track $T_E$ which, in turn, can be used in equation (8) instead of T to compute an accurate relative heading estimate.

For vehicle navigation the relative heading must be computed often, approximately once per second, and the square root operations of the above equation (14) are computationally time consuming. Therefore, in the preferred embodiment of the present invention a plurality of effective tracks $T_E$ are computed and stored in the memory 13 for each of a corresponding number of the ratios $\Delta D/AD$. The set of turning curvatures span the set of realizable turning curvatures $\Delta D/AD$ starting at 0 for straight driving and going to the maximum curvature for the given vehicle geometry (approximately 0.27). With the set of effective tracks stored in the memory 13, the one second navigation computation involves only the calculation of $\Delta D/AD$ and a table look-up to get the effective track $T_E$ for computing the relative heading.

While a preferred embodiment of the present invention is described, it is contemplated that various modifications may be made thereto without departing from the spirit and scope of the present invention. Accordingly, it is intended that the embodiments described be considered only as illustrative of the invention and that the scope of the invention be determined by the claims hereinafter provided

What is claimed is:

1. A method of measuring the change in the heading of a road vehicle during a turn, said vehicle having a pair of laterally spaced wheels which describe a track having a width, comprising the steps of:
   measuring the distance each one of said wheels is rotated during said turn;
   providing a signal $\Delta D$ having a magnitude corresponding to the difference in the measured distances, one of said wheels is rotated relative to the other during said turn;
   measuring the velocity of said vehicle during said turn;
   providing a signal V having a magnitude corresponding to said velocity;
   providing a signal T having a magnitude corresponding to said track width; and
   providing a signal $\Delta\theta_w$ in response to said signals $\Delta D$, T, and V, wherein said signal $\Delta\theta_w$ corresponds to the change in heading of said vehicle during said turn.

2. A method according to claim 1 wherein said step of providing said signal $\Delta\theta_w$ comprises the step of providing said signal $\Delta\theta_w$ with a magnitude which is directly proportional to said signal $\Delta D$, inversely proportional to said signal T and a function of said signal V.

3. A method according to claim 2 comprising the step of:
   providing a signal, a, having a magnitude corresponding to the magnitude of a predetermined constant and said function of said signal V comprises a function of said signal V and said signal, a.

4. A method according to claim 3 comprising the step of precomputing said predetermined constant.

5. A method according to claim 1 comprising the step of providing a signal, a, having a magnitude corresponding to the magnitude of a predetermined constant and wherein said step of providing said signal V comprises the step of providing a signal $V^2$ having a magnitude corresponding to a square of said velocity V and said step of providing said signal $\Delta\theta_w$ comprises the step of providing said signal $\Delta\theta_w$ with a magnitude determined in accordance with the following equation:

$$\Delta\theta_w = \Delta D/T(1+aV^2)$$

6. A method according to claim 3 comprising the step of changing the magnitude of said signal, a, as a function of the difference between the magnitude of said signal $\Delta\theta_w$ and the magnitude of a signal $\Delta\theta_C$ wherein said signal $\Delta\theta_C$ is provided by a heading measuring means which is independent of the means used for providing said signal $\Delta\theta_w$ and has a magnitude corresponding to a change in the heading of said vehicle as measured by said independent heading measuring means.

7. A method according to claim 6 wherein said independent means for providing said signal $\Delta\theta_C$ comprises a compass instrument which is responsive to the earth's magnetic field and said magnitude of said signal $\Delta\theta_C$ corresponds to a change in the heading of said vehicle relative to said earth's magnetic field.

8. A method according to claim 6 wherein said step of changing the magnitude of said signal, a, comprises the steps of:
   providing a signal ERROR having a magnitude corresponding to the difference between the magnitude of said signal $\Delta\theta_C$ and the then current magnitude of said signal $\Delta\theta_w$; and
   changing the magnitude of said signal, a, as a function of the relative magnitudes of said signal, a, before the change and said signal ERROR.

9. A method according to claim 8 wherein said step of changing the magnitude of said signal, a, comprises the steps of:
   providing a signal $a_{old}$ having a magnitude equal to the magnitude of the signal, a before the change;
   providing a signal $T_C$ having a magnitude corresponding to the magnitude of a predetermined constant; and
   providing said signal, a, in response to said signals ERROR, $a_{old}$ and $T_C$ with a magnitude determined in accordance with the following equation:

$$a = a_{old} + \text{ERROR}/T_C$$

10. A method according to claim 6 wherein said steps of changing the magnitude of said signal, a, is performed when said change in heading $\Delta\theta_C$ exceeds a predetermined magnitude, said velocity V is within a predetermined range, and said independent heading measuring means exceeds a predetermined accuracy estimate.

11. A method according to claim 10 wherein said predetermined magnitude of $\Delta\theta_C$ is approximately 45 degrees and said predetermined range of velocity V is from approximately 15 to 45 miles per hour.

12. A method according to claim 1 wherein said signal T providing step comprises the step of providing said signal T with a magnitude which varies as a function of the curvature of turn of said vehicle.

13. A method according to claim 1 wherein said signal T providing step comprises the step of providing said signal T with a magnitude which varies as a function of a geometric foreshortening of said track width during a turn of said vehicle.

14. A method according to claim 1 comprising the step of providing a signal AD having a magnitude corresponding to the average distance said wheels rotate and wherein said steps of providing said signals ΔD and AD comprise the steps of providing said signals ΔD and AD using measurements taken from the rotation of wheels which are laterally spaced by a distance $T_F$ in an Ackerman-type vehicular steering system having a Pitman arm ratio P which is mounted in a vehicle having front and rear axles which are separated by a distance B and said step of providing said signal T comprises the step of providing said signal T with a magnitude determined by the equation:

$$T = T_F \left[ P + (1 - P) \times \sqrt{0.5 + 0.5 \sqrt{1 - \frac{\left(\frac{\Delta D}{AD}\right)^2}{1 - 0.25\left(\frac{\Delta D}{AD}\right)^2} \times \left(\frac{2B}{T_F}\right)^2}} \right]$$

15. A method according to claim 14 wherein said step of providing said signal T comprises the step of providing said signal T from a location in a table look-up memory which is addressed by an address corresponding to the curvature of turn of the vehicle for which the signal T is required.

16. A method according to claim 15 wherein said step of providing said signal T comprises the step of addressing said memory using an address corresponding to the ratio of said signals ΔD and AD.

17. A method of measuring a change in the heading of a road vehicle during a turn, said vehicle having a pair of laterally spaced wheels which describe a track having a width which varies as a function of the curvature of said turn, comprising the steps of:
measuring the distance each one of said wheels is rotated during said turn;
providing a signal ΔD having a magnitude corresponding to the difference in the measured distances, one of said wheels is rotated relative to the other;
providing a signal T having a magnitude corresponding to said track width which varies as a function of the curvature of said turn of said vehicle; and
providing a signal $\Delta\theta_w$ in response to said signals ΔD and T, wherein said signal $\Delta\theta_w$ corresponds to the change in heading of said vehicle during said turn.

18. A method of measuring a change in the heading of a road vehicle during a turn, said vehicle having a pair of laterally spaced wheels which describe a track having a width, comprising the steps of:
measuring the distance each of said wheels is rotated during said turn;
providing a signal ΔD having a magnitude corresponding to the difference in the measured distances, one of said wheels is rotated relative to the other during said turn;
providing a signal T having a magnitude corresponding to said track width which varies as a function of the geometric foreshortening of said track width during said turn of said vehicle; and
providing a signal $\Delta\theta_w$ in response to said signals ΔD and T, wherein said signal $\Delta\theta_w$ corresponds to the change in heading of said vehicle during said turn.

19. A method of measuring the change in heading of a road vehicle during a turn, said vehicle having a pair of laterally spaced wheels which describe a track having a width which varies as a function of the curvature of said turn, comprising the steps of:
measuring the distance each of said wheels is rotated during said turn,
providing a signal ΔD having a magnitude corresponding to the difference in the measured distances, one of said wheels is rotated relative to the other during said turn;
providing a signal AD having a magnitude corresponding to the average distance said wheels rotate during said turn;
providing a signal T having a magnitude corresponding to said track width as determined by the equation:

$$T = T_F \left[ P + (1 - P) \times \sqrt{0.5 + 0.5 \sqrt{1 - \frac{\left(\frac{\Delta D}{AD}\right)^2}{1 - 0.25\left(\frac{\Delta D}{AD}\right)^2} \times \left(\frac{2B}{T_F}\right)^2}} \right]$$

wherein $T_F$ is the distance said wheels are spaced apart in an Ackerman-type vehicular steering system, P is the Pitman arm ratio in said system and B is the distance between the front and rear axles of said vehicle and providing a signal $\Delta\theta_w$ in response to said signals ΔD and T, wherein said signal $\Delta\theta_w$ corresponds to the change in heading of said vehicle during said turn.

20. A method according to claim 19 wherein said step of providing said signal T comprises the step of providing said signal T from a location in a table look-up memory which is addressed by an address corresponding to the curvature of turn of the vehicle for which the signal T is required.

21. A method according to claim 20 wherein said step of providing said signal T comprises the step of addressing said memory using an address corresponding to the ratio of said signals ΔD and AD.

22. An apparatus for measuring a change in heading of a road vehicle during a turn, said vehicle having a pair of laterally spaced wheels which describe a track having a width comprising:

means for measuring the distance each one of said wheels is rotated during said turn;

means responsive to said distance measuring means for providing a signal ΔD having a magnitude corresponding to the difference in the measured distances, one of said wheels is rotated relative to the other during said turn;

means for measuring the velocity of said vehicle during said turn;

means responsive to said velocity measuring means for providing a signal V having a magnitude corresponding to said velocity;

means for providing a signal T having a magnitude corresponding to said track width; and means for providing a signal $\Delta\theta_w$ in response to said signals ΔD, T, and V, wherein said signal $\Delta\theta_w$ corresponds to the change in heading of said vehicle during said turn.

23. An apparatus according to claim 22 wherein said means for providing said signal $\Delta\theta_w$ comprises means for providing said signal $\Delta\theta_w$ with a magnitude which is directly proportional to said ΔD signal and inversely proportional to said signal T and a function of said signal V.

24. An apparatus according to claim 22 comprising: means for providing a signal, a, having a magnitude, corresponding to the magnitude of a predetermined constant, and said function of said signal V comprises a function of said signal V and said signal, a.

25. An apparatus according to claim 24 comprising means for precomputing said constant, a.

26. An apparatus according to claim 22 comprising means for providing a signal, a, having a magnitude corresponding to the magnitude of a predetermined constant and wherein said means for providing said signal V comprises means for providing a signal $V^2$ having a magnitude corresponding to a square of said velocity V and said means for providing said signal $\Delta\theta_w$ comprises means for providing said signal $\Delta\theta_w$ with a magnitude determined in accordance with the following equation:

$$\Delta\theta_w = \Delta D / T(1 + aV^2)$$

27. An apparatus according to claim 26 comprising heading measuring means which is independent of the means used for providing said signal $\Delta\theta_w$ for providing a signal $\Delta\theta_C$ which has a magnitude corresponding to a change in the heading of said vehicle as measured by said independent heading measuring means and means for changing the magnitude of said signal, a, as a function of the difference between the magnitude of said signal $\Delta\theta_w$ and the magnitude of said signal $\Delta\theta_C$.

28. An apparatus according to claim 27 wherein said independent means for providing said signal $\Delta\theta_C$ comprises a compass instrument which is responsive to the earth's magnetic field and said magnitude of said signal $\Delta\theta_C$ corresponds to a change in the heading of said vehicle relative to said earth's magnetic field.

29. An apparatus according to claim 27 wherein said means for changing the magnitude of said signal, a, comprises:

means for providing a signal ERROR having a magnitude corresponding to the difference between the magnitude of said signal $\Delta\theta_C$ and the then current magnitude of said signal $\Delta\theta_w$; and means for changing the magnitude of said signal, a, as a function of the relative magnitudes of said signal, a, before the change and said signal ERROR.

30. An apparatus according to claim 29 wherein said means for changing the magnitude of said signal, a, comprises:

means for providing a signal $a_{old}$ having a magnitude equal to the magnitude of the signal, a before the change;

means for providing a signal $T_C$ having a magnitude corresponding to the magnitude of a predetermined constant; and means for providing said signal, a, in response to said signals ERROR, $a_{old}$ and $T_C$ with a magnitude determined in accordance with the following equation:

$$a = a_{old} + \text{ERROR}/T_C$$

31. An apparatus according to claim 27 wherein said means for changing the magnitude of said signal, a, is performed when said change in heading $\Delta\theta_C$ exceeds a predetermined magnitude, said velocity V is within a predetermined range, and said independent heading measuring means exceeds a predetermined accuracy estimate.

32. An apparatus according to claim 31 wherein said predetermined magnitude of $\Delta\theta_C$ is approximately 45 degrees and said predetermined range of velocity V is from approximately 15 to 45 miles per hour.

33. An apparatus according to claim 22 wherein said signal T providing means comprises means for providing said signal T with a magnitude which varies as a function of the curvature of turn of said vehicle.

34. An apparatus according to claim 33 wherein said signal T providing means comprises means for providing said signal T with a magnitude which varies as a function of a geometric foreshortening of said track width during a turn of said vehicle.

35. An apparatus according to claim 22 comprising means for providing a signal AD having a magnitude corresponding to the average distance said wheels rotate and wherein said means for providing said signal T comprises means for providing said signal T with a magnitude determined by the equation:

$$T = T_F \left[ P + (1-P) \times \sqrt{0.5 + 0.5 \sqrt{1 - \frac{\left(\frac{\Delta D}{AD}\right)^2}{1 - 0.25\left(\frac{\Delta D}{AD}\right)^2} \times \left(\frac{2B}{T_F}\right)^2}} \right]$$

wherein $T_F$ is the distance said wheels are spaced apart in an Ackerman-type vehicular steering system, P is the Pitman arm ratio in said system and B is the distance between the front and rear axles of said vehicle.

36. An apparatus according to claim 35 wherein said means for providing said signal T comprises means for providing said signal T from a location in a table look-up memory which is addressed by an address corresponding to the curvature of turn of the vehicle for which the signal T is required.

37. An apparatus according to claim 36 wherein said means for providing said signal T comprises means for addressing said memory using an address corresponding to the ratio of said signals $\Delta D$ and AD.

38. An apparatus for measuring a change in heading of a road vehicle during a turn, said vehicle having a pair of laterally spaced wheels which describe a track having a width which varies as a function of the curvature of said turn comprising:
- means for measuring the distance each one of said wheels is rotated during said turn;
- means responsive to said distance measuring means for providing a signal $\Delta D$ having a magnitude corresponding to the difference in the measured distances, one of said wheels is rotated relative to the other during said turn;
- means for providing a signal T having a magnitude corresponding to said track width which varies as a function of the curvature of said turn; and
- means for providing a signal $\Delta\theta_w$ in response to said signals $\Delta D$ and T, wherein said signal $\Delta\theta_w$ corresponds to the change in heading of said vehicle during said turn.

39. An apparatus for measuring a change in heading of a road vehicle during a turn, said vehicle having a pair of laterally spaced wheels which describe a track having a width, comprising:
- means for measuring the distance each of said wheels is rotated during said turn;
- means responsive to said distance measuring means for providing a signal $\Delta D$ having a magnitude corresponding to the difference in the measured distances, one of said wheels is rotated relative to the other during said turn;
- means for providing a signal T having a magnitude corresponding to said track width which varies as a function of the geometric foreshortening of said track width during a turn of said vehicle; and
- means for providing a signal $\Delta\theta_w$ in response to said signals $\Delta D$ and T, wherein said signal $\Delta\theta_w$ corresponds to the change in heading of said vehicle during said turn.

40. An apparatus of measuring a change in heading of a road vehicle during a turn, said vehicle having a pair of laterally spaced wheels which describe a track having a width which varies as a function of the curvature of said turn, comprising:
- means for measuring the distance each of said wheels is rotated during said turn;
- means responsive to said distance measuring means for providing a signal $\Delta D$ having a magnitude corresponding to the difference in the measured distances, one of said wheels is rotated relative to the other during said turn;
- means responsive to said distance measuring means for providing a signal AD having a magnitude corresponding to the average distance said wheels rotate during said turn;
- means for providing a signal T having a magnitude corresponding to said track width as determined by the equation:

$$T = T_F \left[ P + (1 - P) \times \sqrt{0.5 + 0.5 \sqrt{1 - \frac{\left(\frac{\Delta D}{AD}\right)^2}{1 - 0.25\left(\frac{\Delta D}{AD}\right)^2}} \times \left(\frac{2B}{T_F}\right)^2} \right]$$

wherein $T_F$ is the distance said wheels are spaced apart in an Ackerman-type vehicular steering system, P is the Pitman arm ratio in said system and B is the distance between the front and rear axles of said vehicle; and means for providing a signal $\Delta\theta_w$ in response to said signals $\Delta D$ and T, wherein said $\Delta\theta_w$ corresponds to the change in heading of said vehicle during said turn.

41. An apparatus according to claim 40 wherein said means for providing said signal T comprises means for providing said signal T from a location in a table look-up memory which is addressed by an address corresponding to the curvature of turn of the vehicle for which the signal T is required.

42. An apparatus according to claim 41 wherein said means for providing said signal T comprises means for addressing said memory using an address corresponding to the ratio of said signals $\Delta D$ and AD.

* * * * *

UNITED STATES PATENT AND TRADEMARK OFFICE
CERTIFICATE OF CORRECTION

PATENT NO. : 4,788,645

DATED : November 29, 1988

INVENTOR(S) : Walter B. Zavoli et al

It is certified that error appears in the above-identified patent and that said Letters Patent is hereby corrected as shown below:

Column 1, line 51, change "and" to --such--.
Column 2, line 66 should be $--\Delta\Theta_w = \Delta D/T(1+aV^2)--$.
Column 7, line 7, "AD/AD" should be $--\Delta D/AD--$.

Signed and Sealed this

Twenty-third Day of May, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,788,645

DATED : November 29, 1988

INVENTOR(S) : Walter B. Zavoli et al

It is certified that error appears in the above-identified patent and that said Letters Patent is hereby corrected as shown below:

Column 7, line 46, before "one" delete the comma (,).
Column 9, line 55, before "one" delete the comma (,).
Column 10, lines 3 and 21, before "one" delete the comma (,).
Column 11, line 6, before "one" delete the comma (,).
Column 13, lines 21 and 39, before "one" delete the comma (,).
Column 14, line 8, before "one" delete the comma (,).

Signed and Sealed this

Twenty-first Day of November, 1989

Attest:

JEFFREY M. SAMUELS

*Attesting Officer*  *Acting Commissioner of Patents and Trademarks*